(12) United States Patent
Jodlbauer et al.

(10) Patent No.: US 6,660,079 B2
(45) Date of Patent: Dec. 9, 2003

(54) DRY MORTARS WITH IMPROVED PROCESSING PROPERTIES

(75) Inventors: Franz Jodlbauer, Marktl (DE); Felix Asen, Ach (AU); Manfred Kugel, Coesfeld (DE)

(73) Assignees: Wacker Polymer Systems GmbH & Co. KG (DE); Brillux GmbH & Co. KG (DE)

( * ) Notice: Subject to any disclaimer, the term of this patent is extended or adjusted under 35 U.S.C. 154(b) by 0 days.

(21) Appl. No.: 10/085,293

(22) Filed: Feb. 28, 2002

(65) Prior Publication Data

US 2002/0162485 A1 Nov. 7, 2002

(30) Foreign Application Priority Data

Mar. 1, 2001 (DE) .......................... 101 09 841
Mar. 22, 2001 (DE) .......................... 101 13 978

(51) Int. Cl.$^7$ .................. C04B 24/00; C04B 24/24; C04B 14/00
(52) U.S. Cl. .................. 106/724; 106/726; 106/733; 106/737; 106/738
(58) Field of Search ................ 106/724, 726, 106/733, 737, 738

(56) References Cited

U.S. PATENT DOCUMENTS 4,130,440 A * 12/1978 Nose et al. ................. 106/627
4,963,190 A * 10/1990 Mizunuma et al. ......... 106/724
6,063,865 A    5/2000 Ball et al.

FOREIGN PATENT DOCUMENTS

| DE | 1 951 171   |         | 4/1971  |
|----|-------------|---------|---------|
| EP | 0 338 293   | A2      | 10/1989 |
| EP | 0 894 822   | A1      | 2/1999  |

OTHER PUBLICATIONS

Derwent Abstract Corresponding To DE 1 951 171 [AN 1971–290755], Apr. 1971.

* cited by examiner

Primary Examiner—Elizabeth D. Wood
(74) Attorney, Agent, or Firm—Brooks Kushman P.C.

(57) ABSTRACT

The invention provides cementitious dry mortars comprising
- a) from 0.5 to 80% by weight of cement,
- b) from 0 to 97% by weight of fillers,
- c) from 0 to 3.5% by weight of thickeners, wherein a polymer powder composition is present, with
- d) from 1.0 to 80% by weight of redispersible polymer powder,
- e) from 0.02 to 4.0% by weight of one or more compounds from the group consisting of zinc oxide, zinc hydroxide, and zinc hydroxide carbonate,
- f) from 0 to 30% by weight of alkali metal hydroxide and/or alkaline earth metal hydroxide, based in each case on the overall weight of the dry mortar, the percentages by weight adding up to 100% by weight.

16 Claims, No Drawings

DRY MORTARS WITH IMPROVED PROCESSING PROPERTIES

BACKGROUND OF THE INVENTION

1. Field of the Invention

The invention relates to cementitious dry mortars modified with a polymer powder composition and to their use as adhesives and coating materials.

2. Background Art

Mixtures of cement and water-redispersible polymer powders are known. The redispersible powder is added as an organic binder to improve adhesion to the substrate and the flexibility of the cured or "set" mixture. Further ingredients of these mixtures include fillers and also thickeners for controlling the rheological properties. Conventional additives also include dispersants, cement plasticizers, and additives for accelerating or retarding the setting of the cement. One example of a mortar base mix is disclosed in DE-A 1951171.

Water-containing, settable mixtures are prepared by admixing the dry components with water, and are then used, for example, in construction adhesives, troweling compositions, reinforcing mortars for exterior insulation and finish systems, and as adhesives for bonding wood flooring. Such compositions have a relatively short pot life, which depending on application, may range from a fraction of an hour up to several hours. The disadvantage of this relatively short pot life is that mortars which cannot be processed promptly are no longer useable and must therefore be disposed of. Especially when cementitious compounds are being processed by machine, the short pot life may result in premature solidification of the material in the machine and its consequent blockage.

In order to delay the setting of cementitious compounds, retardants are frequently used. Retardants have been selected from hydroxycarboxylic acids or dicarboxylic acids or salts thereof, as well as saccharides. Examples include oxalic acid, succinic acid, tartaric acid, gluconic acid, citric acid, sucrose, glucose, fructose, sorbitol and pentaerythritol. Further examples of retarders are polyphosphates, metaphosphoric acid, and borax. A disadvantage associated with the use of such retardants is that although the cement compound remains processable, the water resistance of the set mixture is greatly decreased.

From EP-A 338293 it is known that the mode of action of cement plasticizers based on olefin-maleic anhydride copolymers may be improved by combination with zinc oxide, since complexation of the copolymers with zinc ions prevents the formation of ineffective, water-soluble olefin-maleic acid copolymers by hydrolysis of the anhydride functionality.

SUMMARY OF THE INVENTION

It is an object of the invention to modify cementitious mortar compounds so that their setting is effectively retarded, without significant reduction in the water resistance of the set cement compositions. These and other objects are achieved by providing a dry cementitious mortar mix which contains, in addition to conventional ingredients, a redispersible polymer powder and a most minor quantity of specific zinc compounds, preferably also in conjunction with an alkali metal or alkaline earth metal hydroxide.

DETAILED DESCRIPTION OF THE PREFERRED EMBODIMENT(S)

The invention provides cementitious dry mortars comprising
a) from 0.5 to 80% by weight of cement,
b) from 0 to 97% by weight of fillers,
c) from 0 to 3.5% by weight of thickeners, wherein a polymer powder composition is present, with
d) from 1.0 to 80% by weight of redispersible polymer powder,
e) from 0.02 to 4.0% by weight of one or more compounds from the group consisting of zinc oxide, zinc hydroxide, and zinc hydroxide carbonate,
f) from 0 to 30% by weight of alkali metal hydroxide and/or alkaline earth metal hydroxide,
based in each case on the overall weight of the dry mortar, the percentages by weight adding up to 100% by weight.

The cement fraction a) is preferably from 0.5 to 40% by weight, with particular preference from 8 to 16% by weight. Preference is given to using Portland cement.

Suitable fillers b) are quartz sand, quartz flour, calcium carbonate, dolomite, aluminum silicates, talc or mica, or else lightweight fillers such as pumice, foamed glass, aerated concrete, perlites or vermiculites. Mixtures of said fillers may also be used. The filler fraction is preferably from 10 to 90% by weight, with particular preference from 75 to 90% by weight.

Examples of thickeners c) are polysaccharides such as cellulose ethers and modified cellulose ethers, starch ethers, guar gum or xanthan gum, phyllosilicates, polycarboxylic acids such as polyacrylic acid and the partial esters thereof, polyvinyl alcohols, which optionally have been acetalized and/or hydrophobically modified, casein, and associative thickeners. It is also possible to use mixtures of these or other thickeners. Preference is given to the cellulose ethers, modified cellulose ethers, optionally acetalized and/or hydrophobically modified, polyvinyl alcohols, and mixtures thereof. It is preferred to use from 0.05 to 2.5% by weight, with particular preference from 0.05 to 0.5% by weight, of thickeners.

Water-redispersible polymer powders d) are those which in water break down into primary particles, which are then dispersed ("redispersed") in water. Suitable polymers include those based on one or more monomers from the group embracing vinyl esters of unbranched or branched alkylcarboxylic acids having from 1 to 15 carbon atoms, methacrylic esters and acrylic esters of alcohols having from 1 to 10 carbon atoms, vinyl aromatics, olefins, dienes, and vinyl halides. It is also possible to use mixtures of these polymers. Preference is given to using from 1 to 10% by weight of water-redispersible polymer powders d).

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having from 5 to 11 carbon atoms, examples being VeoVa5$^R$, VeoVa9$^R$, VeoVa10$^R$ or VeoVa11$^R$ (trade names of Shell). Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Preferred vinylaromatics are styrene, methylstyrene, and vinyltoluene. A preferred vinyl halide is vinyl chloride. The preferred olefins are ethylene and propylene, and the preferred dienes are 1,3-butadiene and isoprene.

If desired, the polymers may also contain from 0.1 to 10% by weight, based on the overall weight of the polymer, of functional comonomers. These functional comonomers may include ethylenically unsaturated monocarboxylic or dicarboxylic acids such as acrylic acid; ethylenically unsaturated carboxamides such as (meth)acrylamide; ethylenically unsaturated sulfonic acids and/or their salts, preferably vinylsulfonic acid; polyethylenically unsaturated comonomers, examples being divinyl adipate, diallyl maleate, allyl methacrylate and triallyl cyanurate; and/or N-methylol (meth)acrylamides and their ethers, for example their isobutoxy or n-butoxy ethers.

Particularly preferred polymers are those listed below, the weight percentages adding up to 100% by weight together where appropriate with the fraction of functional comonomer units:

From the group of the vinyl ester polymers: vinyl acetate polymers; vinyl acetate-ethylene copolymers with an ethylene content of from 1 to 60% by weight; vinyl ester-ethylene-vinyl chloride copolymers with an ethylene content of from 1 to 40% by weight and a vinyl chloride content of from 20 to 90% by weight; vinyl acetate copolymers with from 1 to 50% by weight of one or more copolymerizable vinyl esters such as vinyl laurate, vinyl pivalate, vinyl esters of an alpha-branched carboxylic acid, especially Versatic acid vinyl esters (VeoVa9$^R$, VeoVa10$^R$, VeoVa11$^R$), which may also contain from 1 to 40% by weight of ethylene; and vinyl acetate-acrylic ester copolymers with from 1 to 60% by weight of acrylic ester, especially n-butyl acrylate or 2-ethylhexyl acrylate, and which may also contain from 1 to 40% by weight of ethylene.

From the group of the (meth)acrylic ester polymers: polymers of n-butyl acrylate or 2-ethylhexyl acrylate; copolymers of methyl methacrylate with n-butyl acrylate and/or 2-ethylhexyl acrylate; and copolymers of methyl methacrylate with 1,3-butadiene.

From the group of the vinyl chloride polymers: besides the abovementioned vinyl ester/vinyl chloride/ethylene copolymers, vinyl chloride-ethylene copolymers and vinyl chloride-acrylate copolymers.

From the group of the styrene polymers: styrene-butadiene copolymers and styrene-acrylic ester copolymers such as styrene-n-butyl acrylate or styrene-2-ethylhexyl acrylate, each with a styrene content of from 10 to 70% by weight.

The polymers are prepared in a conventional manner, preferably by the emulsion polymerization process. The dispersions used may be stabilized with emulsifier or else with a protective colloid, an example being polyvinyl alcohol. To prepare the water-redispersible polymer powders, the polymer dispersion obtainable in this way is dried. Drying may be effected by means of spray drying, freeze drying, or by coagulation of the dispersion and subsequent fluidized bed drying. Preference is given to spray drying.

The zinc compounds e) are used preferably in an amount of from 0.02 to 2% by weight, with particular preference from 0.05 to 0.5% by weight. It is preferred to use zinc oxide.

As component f), preference is given to the alkaline earth metal hydroxides, especially calcium hydroxide. Component f) is used preferably in an amount of from 0.1 to 10% by weight, with particular preference from 0.1 to 4% by weight.

Most preferred are compositions comprising a) from 8 to 16% by weight of Portland cement, b) from 75 to 90% by weight of one or more fillers from the group consisting of calcium carbonate and/or quartz sand, c) from 0.05 to 0.5% by weight of one or more thickeners from the group consisting of cellulose ethers, modified cellulose ethers, polyvinyl alcohols, acetalized and/or hydrophobically modified polyvinyl alcohols, d) from 1 to 10% by weight of redispersible powders based on one or more monomers from the group consisting of vinyl esters of unbranched or branched alkylcarboxylic acids having from 1 to 15 carbon atoms, methacrylic esters and acrylic esters of alcohols having from 1 to 10 carbon atoms, vinylaromatics, olefins, dienes, and vinyl halides, e) from 0.05 to 0.5% by weight of zinc oxide, and f) from 0.1 to 4% by weight of calcium hydroxide, the sum of the percentages by weight being 100 percent relative to these components.

The composition is generally prepared by mixing components a) to f) to a dry mortar in conventional powder mixers and homogenizing the mixture. The amount of water needed for processing to mortar compounds is added prior to processing. Another possible procedure is to stir the individual components a) to f) separately with water to give a mortar compound.

A further possible procedure is to prepare the cementitious mortar compounds using a formulated redispersible powder additive which includes one or more compounds e) from the group consisting of zinc oxide, zinc hydroxide and zinc hydroxycarbonate and also, if desired, thickeners c) and/or, if desired, alkali metal hydroxide and/or alkaline earth metal hydroxide. The formulated redispersible powder additive preferably contains from 0.5 to 50% by weight of component e), from 0 to 200% by weight, with particular preference from 1 to 200% by weight, of component f), and 0–50% by weight, with particular preference from 0.5 to 50% by weight, of component c), based in each case on the weight fraction of the redispersible powder.

The cementitious mortar compounds obtainable in this way are suitable as adhesives, preferably construction adhesives, particularly as tile adhesives and as adhesives for bonding insulating panels and soundproofing panels. Further applications include that as a reinforcing compound for exterior insulation and finish systems, as a troweling compound, as a grout and as a coating compound (plaster). The cementitious mortar compounds are also suitable for bonding wood and wood materials, for example, to insulating panels.

The composition of the invention gives cementitious compounds which, in contrast to the use of conventional retardants, remain processable over several days without a loss in water resistance after hardening. This effect may be increased still further by including Ca hydroxide in the composition.

The examples which follow serve to illustrate the invention.

The performance properties were tested using the following formulation:

| | |
|---|---|
| 24.4 parts by weight | of white cement (CEM I 52.5 R) (a) |
| 34.7 parts by weight | of calcium carbonate (Omyacarb 40-GU) (b) |
| 33.6 parts by weight | of calcium carbonate (Omyacarb 130-BG) (b) |
| 97.7 parts by weight | of quartz sand (HR 81 T) (b) |
| 0.3 part by weight | of cellulose ether (Walocel MKX 25000PF 25 L) (c) |

| | |
|---|---|
| 8.0 parts by weight | of redispersible powder (d) |
| 0.3 part by weight | of zinc oxide (e) |
| 1.0 part by weight | of calcium hydroxide (f) |

This dry mix was stirred in each case with 24% by weight of water, based on the overall weight of the dry mix.

Hardening

To assess the hardening, the mortar was introduced into a 100 ml plastic beaker which was sealed with a lid. It was then stored for one day or two days, respectively, at room temperature and then tested to find out whether the material could still be processed by troweling.

The hardening of the coat was assessed qualitatively: 0=hardened; 1=solidified but not hardened; 2=still processable after stirring; 3=readily processable; 4=outstandingly processable. The results are indicated in Tables 1 and 2.

Water Resistance

The mortar was applied in a coat thickness of 2 mm to a support slab of expanded polystyrene foam. The slab was then stored at room temperature for 28 days. Subsequently, 2 ml of water were applied by pipette to several sites and left to act for one hour. The water resistance was assessed qualitatively by scratching the wetted sites: 1=poor, 2=adequate, 3=good, 4=excellent. The results are indicated in Tables 1 and 2.

Determination of Tensile Bond Strength

To determine the tensile bond strength, the mortar was applied 3 mm thick with a trowel, using a 5×5 cm² stencil, to expanded polystyrene foam. The foam was then stored for 11 days under standard conditions (DIN 50014, 23° C., 50% air humidity). Following storage, metal plates which served as tension anchors for the measurements were bonded to the samples using epoxy adhesive. The samples were then stored in water for 48 hours each. The tensile bond strengths were determined using a pulloff device from Herion. The measurements in N/mm² are indicated in tables 1 and 2 and represent a mean of 3 measurements.

The redispersible powders tested were as follows:

Powder 1

A mixture of a polyvinyl alcohol-stabilized vinyl acetate-ethylene copolymer powder of MFT=0° C. (RE5044N) and a polyvinyl alcohol-stabilized vinyl chloride-ethylene-vinyl laurate copolymer powder of MFT=0° C. (RI554Z) in a weight ratio of 2:1

Powder 2

Polyvinyl alcohol-stabilized vinyl acetate-ethylene copolymer powder of MFT=0° C. (RE5044N)

Powder 3

Polyvinyl alcohol-stabilized vinyl acetate-ethylene copolymer powder of MFT=0° C. (RE545Z)

Powder 4

Polyvinyl alcohol-stabilized vinyl acetate-vinyl ester-ethylene copolymer powder of MFT=2° C. (RE5034N)

Powder 5

Polyvinyl alcohol-stabilized vinyl acetate-VeoVa-vinyl laurate copolymer powder of MFT=4° C. (RI538Z)

Powder 6

Polyvinyl alcohol-stabilized butyl acrylate-methyl methacrylate copolymer powder (LL5315).

TABLE 1

| Powder | 1 | 2 | 3 | 4 | 5 | 6 | 1* | 1** | 1*** |
|---|---|---|---|---|---|---|---|---|---|
| Tensile adhesion N/mm² | 0.06 | 0.07 | 0.07 | 0.06 | 0.04 | 0.04 | 0.06 | 0.07 | 0.06 |
| Hardening, 1 day | 2.0 | 2.75 | 3.0 | 3.0 | 2.25 | 2.0 | 1.75 | 0 | 1.75 |
| Hardening, 2 day | 1.75 | 2.0 | 2.5 | 2.5 | 2.0 | 1.25 | 1.25 | 0 | 1.5 |
| H₂O resistance | 2.5 | 2.75 | 2.5 | 2.5 | 2.5 | 2.25 | 2.0 | 3.0 | 2.0 |

1* = powder 1 but without Ca hydroxide
1** = powder 1 but without zinc oxide
1*** = powder 1 but with zinc hydroxide carbonate The comparison of 1 with 1* shows the synergy effect of the combination of components e) and f): when the two components are combined, a marked improvement is obtained in respect of retarded hardening and water resistance.

The experiment with powder 1** shows that, although good bond strength and water resistance are obtained with component f) alone, the hardening is not retarded.

For comparison between the performance properties of the inventive combination and those of mortars modified with conventional retardants, the following formulation was used. Testing was carried out in analogy to the methods specified above.

| | |
|---|---|
| 24.4 parts by weight | of white cement (CEM I 52.5 R) (a) |
| 34.5 parts by weight | of calcium carbonate (Omyacarb 40-GU) (b) |
| 33.5 parts by weight | of calcium carbonate (Omyacarb 130-BG) (b) |
| 97.4 parts by weight | of quartz sand (HR 81 T) (b) |
| 0.3 part by weight | of cellulose ether (Walocel MKX 25000PF 25 L) (c) |
| 8.0 parts by weight | of redispersible powder (powder mixture 1) (d) |
| 0.4 part by weight | of retardant |
| 1.5 parts by weight | of calcium hydroxide (f) |

This dry mix was stirred in each case with 24% by weight of water, based on the overall weight of the dry mix. The test results are summarized in Table 2.

The test results show that without retardants the compound hardens immediately. With retardant, hardening is retarded, the retardation brought about with zinc oxide being at least similar to that effected with conventional retardants. In contrast to conventional retardants, however, with zinc oxide the tensile bond strength and the water resistance are retained.

TABLE 2

| Retardant | None | Zinc oxide | Tartaric acid | Citric acid | Tri-Na citrate |
|---|---|---|---|---|---|
| Tensile adhesion N/mm$^2$ | 0.07 | 0.07 | 0.04 | 0.03 | 0.04 |
| Curing, 1 day | 0 | 2.75 | 3.25 | 2.75 | 2.75 |
| Curing, 4 day | 0 | 2.5 | 3.0 | 2.0 | 2.5 |
| H$_2$O resistance | 3.0 | 2.5 | 1.25 | 1.25 | 1.25 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cementitious dry mortar comprising
    a) from 0.5 to 80% by weight of cement,
    b) from 0 to 97% by weight of fillers,
    c) from 0 to 3.5% by weight of thickeners,
    d) from 1.0 to 80% by weight of redispersible polymer powder,
    e) from 0.02 to 4.0% by weight of one or more compounds selected from the group consisting of zinc oxide, zinc hydroxide, and zinc hydroxide carbonate,
    f) from 0 to 30% by weight of alkali metal hydroxide and/or alkaline earth metal hydroxide,
the percentages by weight based in each case on the overall weight of the dry mortar, the percentages by weight adding up to 100% by weight.

2. The mortar of claim 1, comprising as water-redispersible polymer powders d) at least one redispersible polymer powder prepared from vinyl esters of unbranched or branched alkylcarboxylic acids having from 1 to 15 carbon atoms, methacrylic esters of C$_{1-10}$ alcohols, acrylic esters of C$_{1-10}$ alcohols, vinylaromatics, olefins, dienes, or vinyl halides.

3. The mortar of claim 1, wherein component f) is present, and comprising as component f) from 0.1 to 10% by weight of one or more alkaline earth metal hydroxides.

4. The mortar of claim 3, comprising as component f) calcium hydroxide.

5. A cementitious dry mortar comprising
    a) from 8 to 16% by weight of Portland cement,
    b) from 75 to 90% by weight of one or more fillers from the group consisting of calcium carbonate and/or quartz sand,
    c) from 0.05 to 0.5% by weight of at least one thickener selected from the group consisting of cellulose ethers, modified cellulose ethers, and optionally acetalized and/or hydrophobically modified polyvinyl alcohols,
    d) from 1 to 10% by weight of redispersible powders based on at least one monomer selected from the group consisting of vinyl esters of unbranched or branched C$_{1-15}$ alkylcarboxylic acids, methacrylic esters of C$_{1-10}$ alcohols, acrylic esters of C$_{1-10}$ alcohols, vinylaromatics, olefins, dienes, and vinyl halides,
    e) from 0.05 to 0.5% by weight of zinc oxide, and
    f) from 0.1 to 4% by weight of calcium hydroxide.

6. A process for preparing the mortar of claim 1, comprising mixing components a) to f) in a powder mixer.

7. A process for preparing a water-containing settable mortar, comprising mixing components a) to f) to a dry mortar and admixing the amount of water required for processing to a settable mortar, optionally adding further individual components subsequently to the preparation of the water-containing settable mortar.

8. A process for preparing water-containing settable cementitious mortar compositions, comprising separately adding individual components a) to f) to water and mixing to give a water-containing, settable composition.

9. A process for preparing setting-retarded cementitious mortar compositions, comprising adding to a mixture comprising cement and optional filler, a formulated powder additive comprising at least one redispersible polymer powder d) and at least one compound e) selected from the group consisting of zinc oxide, zinc hydroxide, and zinc hydroxycarbonate, optionally a thickener c) and/or optionally one or more alkali metal hydroxides and/or alkaline earth metal hydroxides.

10. An adhesive or coating composition comprising the mortar of claim 1.

11. The composition of claim 10 which is a tile adhesive.

12. The composition of claim 10 which comprises an adhesive for bonding insulation panels or soundproofing panels.

13. The composition of claim 10 which comprises a reinforcing compound for exterior insulation and finish systems.

14. The composition of claim 10 which comprises a troweling compound.

15. The composition of claim 10 which comprises a grout.

16. The composition of claim 10 which comprises an adhesive for bonding wood and wood materials.

* * * * *